United States Patent
Sata

[11] Patent Number: 5,870,664
[45] Date of Patent: Feb. 9, 1999

[54] METHOD AND APPARATUS FOR REMOVING IMPURITY BY AN IMPROVED ELECTRODE

[75] Inventor: Naoaki Sata, Tokyo, Japan

[73] Assignee: NEC Corporation, Tokyo, Japan

[21] Appl. No.: 865,163

[22] Filed: May 29, 1997

[30] Foreign Application Priority Data

May 29, 1996 [JP] Japan .................................. 8-135426

[51] Int. Cl.[6] .................................................. B01J 19/08
[52] U.S. Cl. ................................ 422/186.3; 422/186.04; 204/157.3; 204/164
[58] Field of Search ........................... 422/186.04, 186.3; 204/164, 157.3

[56] References Cited

FOREIGN PATENT DOCUMENTS 5-21410  1/1993  Japan.

*Primary Examiner*—Kishor Mayekar
*Attorney, Agent, or Firm*—Young & Thompson

[57] ABSTRACT

A method and apparatus for removing an impurity by use of an electrode having a surface coated with a catalyst which is capable of decomposing an impurity into decomposition products. An impurity is ionized with photoelectron for attracting an ionized impurity toward an electrode applied with a voltage to capture the ionized impurity on the electrode. An captured impurity is decomposed by the catalyst into decomposition products whereby no ionized impurity is accumulated on the surface of the electrode.

20 Claims, 1 Drawing Sheet

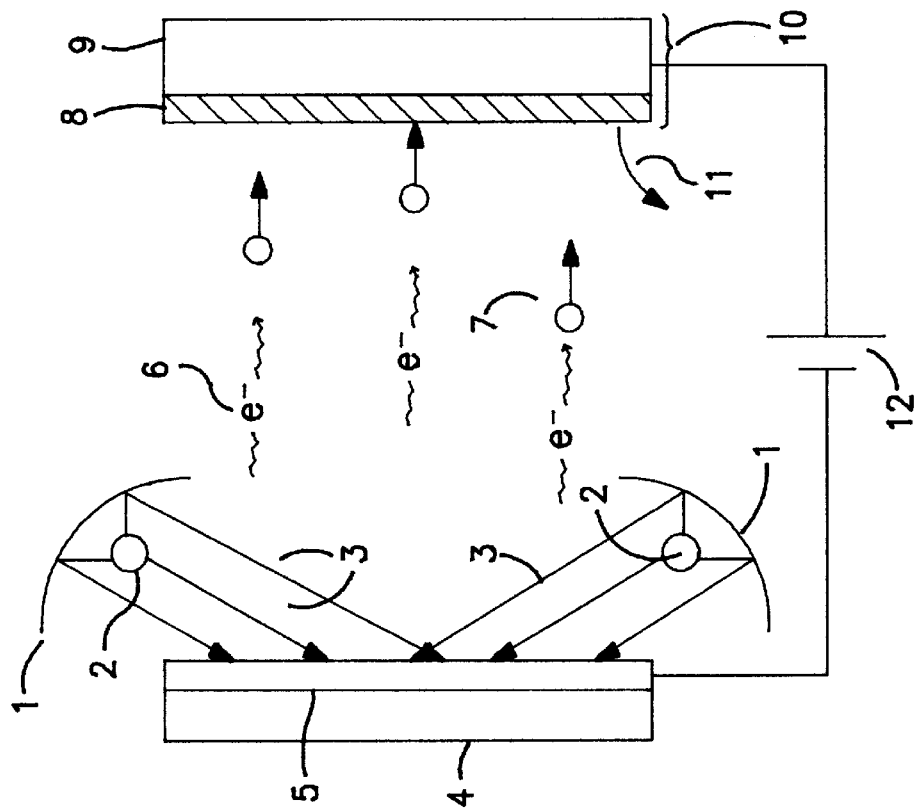
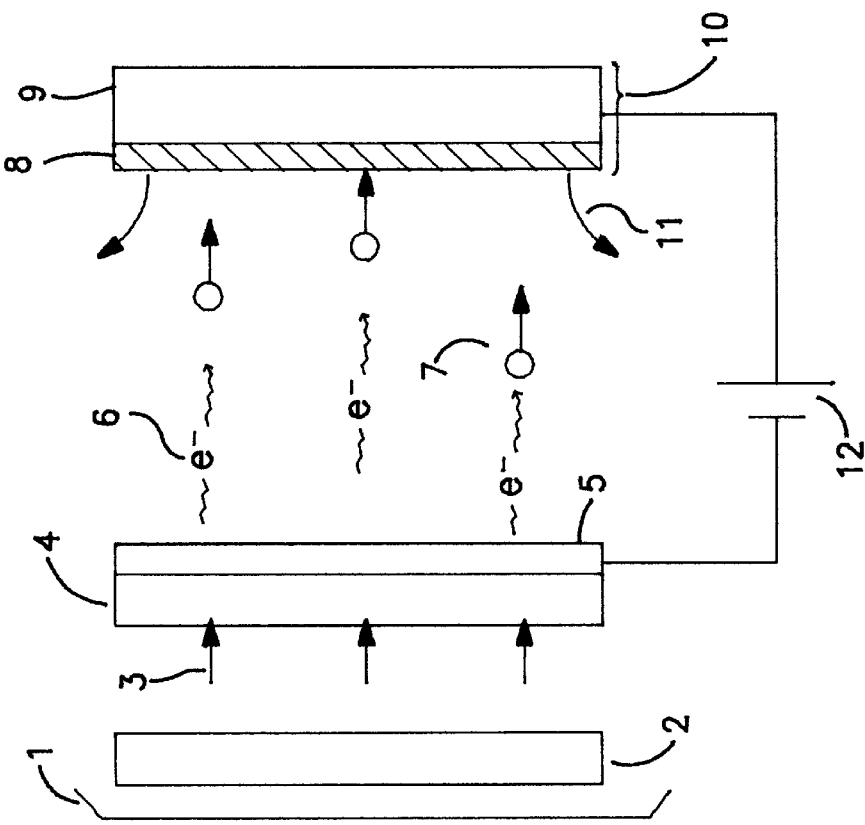

METHOD AND APPARATUS FOR REMOVING IMPURITY BY AN IMPROVED ELECTRODE

BACKGROUND OF THE INVENTION

The present invention relates to a method of removing impurity and an improved electrode capable of removing impurity, and more particularly to a method of removing impurity wherein impurity is ionized with photoelectron caused by ultraviolet ray to have the ionized impurity captured by paired electrodes.

One of the conventional methods for removing impurity by use of photoelectron is disclosed in the Japanese laid-open patent publication No. 5-21410. Electromagnetic waves including an ultraviolet ray are irradiated to a photoelectron emitting material such as a metal, an alloy or a compound having a small photo-electric threshold which corresponds to an energy smaller than the energy of the ultraviolet ray, so as to cause photoelectron to be emitted from the photoelectron emitting material. The emitted photoelectron causes ionization of impurity which is floating in a space in the vicinity of a surface of a substrate. The ionized impurity or charged impurity is attracted to and captured with an electrode having an opposite polarity to a polarity of the ionized or charged impurity for removal of impurity from the space over the substrate.

The above conventional method has the following advantages. First, no movable member is required. There is produced no by-products such as ozone, differently from the cleaning process using ozone. Third, it is possible to remove not only organic impurity but also inorganic impurity.

The above conventional method, however, has the following disadvantages. The ionized impurity is captured with and accumulated onto the capturing electrode. The accumulation of the ionized impurity onto the capturing electrode leads to reduction in capability of capturing the ionized impurity or in efficiency of removal of the impurity. In order to remove the accumulated impurity from the capturing electrode, it is required to stop applying a voltage to the capturing electrode or discontinue removal operations of impurity from the space over the substrate. This discontinuation of applying the voltage to the capturing electrode permits rediffusion or release of the ionized impurity once captured with the electrode into the space over the substrate due to no voltage application to the electrode.

In the above circumstances, it had been required to develop a novel method of removal of impurity and improve a capturing electrode capable of removing impurity with avoiding an excessive accumulation of the captured impurity even without discontinuation of applying the voltage to the capturing electrode.

SUMMARY OF THE INVENTION

Accordingly, it is an object of the present invention to provide an electrode for capturing impurity ionized by photoelectron, which is free from the disadvantages as described above.

It is a further object of the present invention to provide an electrode for capturing impurity ionized by photoelectron, without excessive accumulation of the captured impurity on the electrode.

It is a still further object of the present invention to provide an electrode for capturing impurity ionized by photoelectron, without discontinuation of applying a voltage to the capturing electrode.

It is a yet further object of the present invention to provide an electrode for capturing impurity ionized by photoelectron, without discontinuation of impurity removal operation.

It is further more object of the present invention to provide an electrode for capturing impurity ionized by photoelectron, without rediffusion or release of the ionized impurity once captured with the electrode.

It is moreover object of the present invention to provide an electrode for capturing impurity ionized by photoelectron, without rediffusion or release of the ionized impurity once captured with the electrode.

It is an additional object of the present invention to provide an apparatus for removing impurity, which is free from the disadvantages as described above.

It is a further additional object of the present invention to provide an apparatus for removing impurity, without excessive accumulation of the captured impurity on the electrode.

It is a still further additional object of the present invention to provide an electrode for capturing impurity ionized by photoelectron, without discontinuation of applying a voltage to the capturing electrode.

It is a yet further additional object of the present invention to provide an apparatus for removing impurity, without discontinuation of impurity removal operation.

It is further more additional object of the present invention to provide an apparatus for removing impurity, without rediffusion or release of the ionized impurity once captured with the electrode.

It is moreover additional object of the present invention to provide an apparatus for removing impurity, without rediffusion or release of the ionized impurity once captured with the electrode.

It is another object of the present invention to provide a method of removing impurity from a space in the vicinity of a substrate surface by having electrodes capture impurity ionized by photoelectron, which is free from the disadvantages as described above.

It is further another object of the present invention to provide a method of removing impurity from a space in the vicinity of a substrate surface by having electrodes capture impurity ionized by photoelectron, without excessive accumulation of the captured impurity on the electrode.

It is still another object of the present invention to provide a method of removing impurity from a space in the vicinity of a substrate surface by having electrodes capture impurity ionized by photoelectron, without discontinuation of applying a voltage to the capturing electrode.

It is yet another object of the present invention to provide a method of removing impurity from a space in the vicinity of a substrate surface by having electrodes capture impurity ionized by photoelectron, without discontinuation of impurity removal operation.

It is still more object of the present invention to provide a method of removing impurity from a space in the vicinity of a substrate surface by having electrodes capture impurity ionized by photoelectron, without rediffusion or release of the ionized impurity once captured with the electrode.

It is yet more object of the present invention to provide a method of removing impurity from a space in the vicinity of a substrate surface by having electrodes capture impurity ionized by photoelectron, without rediffusion or release of the ionized impurity once captured with the electrode.

The above and other objects, features and advantages of the present invention will be apparent from the following descriptions.

The present invention provides an electrode applied with a voltage for attracting impurity ionized toward the electrode and capturing the impurity ionized, wherein the electrode has a surface coated with a catalyst which is capable of decomposing the ionized impurity into decomposition products so that the catalyst captures and decomposes the ionized impurity into decomposition products without accumulation of the ionized impurity on the surface of the electrode.

The present invention provides a method of removing an impurity by use of an electrode having a surface coated with a catalyst which is capable of decomposing an impurity into decomposition products. The method comprises the following steps. An impurity is ionized with photoelectron for attracting an ionized impurity toward an electrode applied with a voltage to capture the ionized impurity on the electrode. An captured impurity is decomposed by the catalyst into decomposition products whereby no ionized impurity is accumulated on the surface of the electrode.

BRIEF DESCRIPTIONS OF THE DRAWINGS

Preferred embodiments according to the present invention will be described in detail with reference to the accompanying drawings.

FIG. 1 is a view illustrative of an apparatus for removing impurity in first and second embodiments according to the present invention.

FIG. 2 is a view illustrative of an apparatus for removing impurity in third and fourth embodiments according to the present invention.

DISCLOSURE OF THE INVENTION

The present invention provides an electrode applied with a voltage for attracting impurity ionized toward the electrode and capturing the impurity ionized, wherein the electrode has a surface coated with a catalyst which is capable of decomposing the ionized impurity into decomposition products so that the catalyst captures and decomposes the ionized impurity into decomposition products without accumulation of the ionized impurity on the surface of the electrode.

It is preferable that the electrode comprises an iron rod coated with a palladium layer and the catalyst comprises platinum coated on the palladium layer.

It is also preferable that the catalyst comprises an oxidation catalyst which decomposes dioctylphthalate as the impurity into carbon dioxide and water.

It is also preferable that the catalyst comprises an oxidation catalyst which decomposes a linoleic acid as the impurity into carbon dioxide and water.

The present invention provides an apparatus for removing impurity comprising the following elements. A supporter is provided for supporting thereon a photoelectron emission material which emits photoelectron upon receipt of an electromagnetic wave having a higher energy than a photoelectric threshold value of the photoelectron emission material. An electrode is provided which is distanced from the means for supporting the photoelectron emission material via a space which possesses gases including an impurity. The electrode is electrically connected via a power source to the means for supporting the photoelectron emission material so that the electrode is applied with a voltage to apply an electric field to the space. An electromagnetic wave emitter is provided for irradiating the electromagnetic wave onto the photoelectron emission material to cause the photoelectron emission material to emit, into the space, photoelectron which is capable of ionizing the impurity in the gases so that an ionized impurity is attracted toward the electrode. The electrode has a surface coated with a catalyst which is capable of decomposing the ionized impurity into decomposition products so that the catalyst captures and decomposes the ionized impurity into decomposition products without accumulation of the ionized impurity on the surface of the electrode.

It is preferable that the electrode comprises an iron rod coated with a palladium layer and the catalyst comprises platinum coated on the palladium layer.

It is also preferable that the catalyst comprises an oxidation catalyst which decomposes dioctylphthalate as the impurity into carbon dioxide and water.

It is also preferable that the catalyst comprises an oxidation catalyst which decomposes a linoleic acid as the impurity into carbon dioxide and water.

It is also preferable that the means for irradiating the electromagnetic wave comprises at least a ultraviolet ray lamp which is positioned at an opposite side of the means for supporting the photoelectron emission material to the photoelectron emission material, and wherein the means for supporting the photoelectron emission material comprises a supporting plate made of a material which allows the ultraviolet ray to penetrate through the supporting plate so that the ultraviolet ray lamp emits a ultraviolet ray which penetrates through the supporting plate and reaches the photoelectron emission material whereby the photoelectron emission material emits photoelectron. In this case, there may further be provided at least a reflection mirror at an opposite side of the ultraviolet ray lamp to the supporting plate for reflecting a ultraviolet ray emitted from the ultraviolet ray lamp toward the supporting plate so that a reflected ultraviolet ray penetrates through the supporting plate and reaches the photoelectron emission material.

It is also preferable that the means for irradiating the electromagnetic wave comprises at least a ultraviolet ray lamp which is positioned at a front side of the photoelectron emission material for emitting a ultraviolet ray and irradiating the ultraviolet ray directly onto the photoelectron emission material whereby the photoelectron emission material emits photoelectron.

It is also preferable that a plurality of the ultraviolet ray lamps are provided obliquely in front of the photoelectron emission material for irradiating the ultraviolet ray obliquely onto the photoelectron emission material.

It is also preferable that the means for supporting the photoelectron emission material comprises a supporting plate made of a material which prevents the ultraviolet ray from penetrating through the supporting plate.

In the above case, there may further be provided at least a reflection mirror provided at an opposite side of the ultraviolet ray lamp to the supporting plate for reflecting a ultraviolet ray emitted from the ultraviolet ray lamp toward the supporting plate so that a reflected ultraviolet ray is irradiated onto the photoelectron emission material.

The present invention provides a method of removing an impurity by use of an electrode having a surface coated with a catalyst which is capable of decomposing an impurity into decomposition products. The method comprises the following steps. An impurity is ionized with photoelectron for attracting an ionized impurity toward an electrode applied with a voltage to capture the ionized impurity on the electrode. An captured impurity is decomposed by the catalyst into decomposition products whereby no ionized impurity is accumulated on the surface of the electrode.

It is also preferable that the electrode used comprises an iron rod coated with a palladium layer and the catalyst used comprises platinum coated on the palladium layer.

It is also preferable that the catalyst used comprises an oxidation catalyst which decomposes dioctylphthalate as the impurity into carbon dioxide and water.

It is also preferable that the catalyst used comprises an oxidation catalyst which decomposes a linoleic acid as the impurity into carbon dioxide and water.

PREFERRED EMBODIMENTS

First Embodiment

A first embodiment according to the present invention will be described in detail with reference to FIG. 1 illustrative of an apparatus for removing impurity from a space in the vicinity of a surface of a substrate.

The apparatus comprises the following elements. A supporter 4 is provided for supporting a photoelectron emission material 5 thereon. The supporter 4 is made of quartz. A ultraviolet ray lamp 2 is provided to face to the supporter 4 but to be spaced from the supporter 4. A reflection mirror 1 is also provided at an opposite side of the ultraviolet ray lamp 2 to the supporter 4. The reflection mirror 1 is spaced apart from the ultraviolet ray lamp 2. The ultraviolet ray lamp 2 emits a ultraviolet ray 3 or electromagnetic wave including the ultraviolet ray 3. The ultraviolet ray 3 emitted toward the supporter 4 penetrates through the supporter 4 and reaches the photoelectron emission material 5. The ultraviolet ray 3 emitted toward the reflection mirror 1 is reflected by the reflection mirror 1 toward the supporter 4 whereby the reflected ultraviolet ray 3 then penetrates through the supporter 4 and reaches the photoelectron emission material 5. Since the photoelectron emission material 5 has a photoelectric threshold which is lower than an energy of the ultraviolet ray 3, the photoelectron emission material 5 emits photoelectrons 6. The photoelectron 6 is then irradiated onto an impurity 7 whereby the impurity 7 is ionized by photoelectron 7. An electrode 9 is provided which is connected to a dc power source 12 for receiving an application of a high voltage. The supporter 4 is also connected to the dc power source 12 for receiving an application of a low voltage. Namely, the electrode 9 and the supporter 4 are biased by the dc power source 12. The electrode 9 is spaced apart from the supporter 4. A catalyst 8 capable of decomposing the impurity 8 is provided on the electrode 9 so as to form an electrode 10 for decomposing impurity. The catalyst 8 on the electrode 9 faces to and is distanced from the photoelectron emission material 5 on the supporter 4. An electric field is applied to a space between the supporter 4 and the electrode 9 biased by the dc power source 12. The impurities 7 are floating in the space between the supporter 4 and the electrode 9. The impurity 7 is ionized by photoelectron and then attracted toward the electrode 9 by the electric field. Since the catalyst 8 extends over the surface of the electrode 9, the ionized impurity 7 is captured by the catalyst 8 which is capable of decomposing the impurity 8 into a decomposition product 11. The decomposition product 11 is removed from the surface of the electrode 9. Namely, the impurity 7 is ionized by the photoelectron 6 and recomposed by the catalyst 8 into the decomposition product 11. As a result, the impurity is removed continuously without excessive accumulation of the captured impurity on the electrode 10. This means it unnecessary to discontinue application of a voltage to the capturing electrode. The above apparatus is free from the problem with rediffusion or release of the ionized impurity once captured with the electrode.

In the above first embodiment, the photoelectron emission material 5 comprises Au. Notwithstanding, metals having smaller photoelectric threshold values than an energy of the ultraviolet ray are available. For, example, Ag (4.46 eV), Al (4.20 eV), Au (4.89 eV), B (4.50 eV), Be (3.90 eV), Bi (4.26 eV), C (4.81 eV), Cu (4.45 eV), Fe (4.44 eV), Mg (3.67 eV), Nb (4.37 eV), Pb (4.00 eV), Rh (4.29 eV), Pb (4.00 eV), Sn (4.29 eV), Ta (4.13 eV), Zn (4.29 eV), and Zr (4.33 eV) are available. Further, alloys of the above metals, carbonate of the above metals and borate of the above metals are also available.

As the ultraviolet ray lamp 2, a mercury-arc lamp with main emission wavelength of about 254 nm, carbon-arc lamp with main emission wavelength of about 375 nm, and xenon lamp with main emission wavelength of about 460 nm are also available.

It is preferable that the photoelectron emission material 5 and the supporter 4 are thin for allowing the ultraviolet ray 3 to penetrate the photoelectron emission material 5 and the supporter 4 for emission of photoelectron 6 at a high efficiency.

In the above first embodiment, the quartz supporter 4 is coated with Au. Notwithstanding, other materials through which ultraviolet ray may penetrate are available for the supporter 4.

The electrode 9 comprises an iron rod plated with palladium. The catalyst comprises platinum as oxidation catalyst.

Further, the impurity 7 comprises dioctylphthalate. The power source 12 applies a voltage of 120 V to the electrode 9 for having the catalyst 8 capture the ionized impurity 7 and decompose the captured impurity into carbon dioxide and water as the decomposition product 11. The catalyst 8 causes an oxidation and decomposition reaction of dioctylphthalate. After 1000 hours has past, no accumulation of dioctylphthalate on the electrode 10 is observed.

An analyze of gases in the chamber was made to confirm the fact that an impurity of dioctylphthalate in the gas is gradually decreased whilst an impurity of carbon dioxide in the gas is gradually increased. This means that dioctylphthalate is captured by the electrode 10 and decomposed into carbon dioxide and water.

Second Embodiment

A second embodiment according to the present invention will be described in detail with reference to FIG. 1 illustrative of an apparatus for removing impurity from a space in the vicinity of a surface of a substrate.

The apparatus comprises the following elements. A supporter 4 is provided for supporting a photoelectron emission material 5 thereon. The supporter 4 is made of quartz. A ultraviolet ray lamp 2 is provided to face to the supporter 4 but to be spaced from the supporter 4. A reflection mirror 1 is also provided at an opposite side of the ultraviolet ray lamp 2 to the supporter 4. The reflection mirror 1 is spaced apart from the ultraviolet ray lamp 2. The ultraviolet ray lamp 2 emits a ultraviolet ray 3 or electromagnetic wave including the ultraviolet ray 3. The ultraviolet ray 3 emitted toward the supporter 4 penetrates through the supporter 4 and reaches the photoelectron emission material 5. The ultraviolet ray 3 emitted toward the reflection mirror 1 is reflected by the reflection mirror 1 toward the supporter 4 whereby the reflected ultraviolet ray 3 then penetrates through the supporter 4 and reaches the photoelectron emission material 5. Since the photoelectron emission material 5 has a photoelectric threshold which is lower than an energy of the ultraviolet ray 3, the photoelectron emission material 5 emits photoelectrons 6. The photoelectron 6 is then irradiated onto an impurity 7 whereby the impurity 7 is ionized by photoelectron 7. An electrode 9 is provided which is connected to a dc power source 12 for receiving an application of a high voltage. The supporter 4 is also connected to the dc power source 12 for receiving an application of a low voltage. Namely, the electrode 9 and the supporter 4 are biased by the dc power source 12. The electrode 9 is spaced apart from the supporter 4. A catalyst 8 capable of decomposing the impurity 8 is provided on the electrode 9 so as to form an electrode 10 for decomposing impurity. The catalyst 8 on the electrode 9 faces to and is distanced from the photoelectron emission material 5 on the supporter 4. An electric field is applied to a space between the supporter 4 and the electrode 9 biased by the dc power source 12. The impurities 7 are floating in the space between the supporter 4 and the electrode 9. The impurity 7 is ionized by photoelectron and then attracted toward the electrode 9 by the electric field. Since the catalyst 8 extends over the surface of the electrode 9, the ionized impurity 7 is captured by the catalyst 8 which is capable of decomposing the impurity 8 into a decomposition product 11. The decomposition product 11 is removed from the surface of the electrode 9. Namely, the impurity 7 is ionized by the photoelectron 6 and recomposed by the catalyst 8 into the decomposition product 11. As a result, the impurity is removed continuously without excessive accumulation of the captured impurity on the electrode 10. This means it unnecessary to discontinue application of a voltage to the capturing electrode. The above apparatus is free from the problem with rediffusion or release of the ionized impurity once captured with the electrode.

In the above second embodiment, the photoelectron emission material 5 comprises Au. Notwithstanding, metals having smaller photoelectric threshold values than an energy of the ultraviolet ray are available. For, example, Ag (4.46 eV), Al (4.20 eV), Au (4.89 eV), B (4.50 eV), Be (3.90 eV), Bi (4.26 eV), C (4.81 eV), Cu (4.45 eV), Fe (4.44 eV), Mg (3.67 eV), Nb (4.37 eV), Pb (4.00 eV), Rh (4.29 eV), Pb (4.00 eV), Sn (4.29 eV), Ta (4.13 eV), Zn (4.29 eV), and Zr (4.33 eV) are available. Further, alloys of the above metals, carbonate of the above metals and borate of the above metals are also available.

As the ultraviolet ray lamp 2, a mercury-arc lamp with main emission wavelength of about 254 nm, carbon-arc lamp with main emission wavelength of about 375 nm, and xenon lamp with main emission wavelength of about 460 nm are also available.

It is preferable that the photoelectron emission material 5 and the supporter 4 are thin for allowing the ultraviolet ray 3 to penetrate the photoelectron emission material 5 and the supporter 4 for emission of photoelectron 6 at a high efficiency.

In the above second embodiment, the quartz supporter 4 is coated with Au. Notwithstanding, other materials through which ultraviolet ray may penetrate are available for the supporter 4.

The electrode 9 comprises an iron rod plated with palladium. The catalyst comprises platinum as oxidation catalyst.

Further, the impurity 7 comprises linoleic acid. The power source 12 applies a voltage of 120 V to the electrode 9 for having the catalyst 8 capture the ionized impurity 7 and decompose the captured impurity into carbon dioxide and water as the decomposition product 11. The catalyst 8 causes an oxidation and decomposition reaction of a linoleic acid. After 1000 hours has past, no accumulation of linoleic acid on the electrode 10 is observed.

An analyze of gases in the chamber was made to confirm the fact that an impurity of linoleic acid in the gas is gradually decreased whilst an impurity of carbon dioxide in the gas is gradually increased. This means that linoleic acid is captured by the electrode 10 and decomposed into carbon dioxide and water.

Third Embodiment

A third embodiment according to the present invention will be described in detail with reference to FIG. 2 illustrative of an apparatus for removing impurity from a space in the vicinity of a surface of a substrate.

The apparatus comprises the following elements. A supporter 4 is provided for supporting a photoelectron emission material 5 thereon. The supporter 4 is made of a material which prevents electromagnetic waves including ultraviolet ray from penetrating itself. Ultraviolet ray lamps 2 are provided obliquely in front of the photoelectron emission material 5 but to obliquely face to the photoelectron emission material 5 but to be spaced from the photoelectron emission material 5 so that the ultraviolet ray lamps 2 emit electromagnetic waves including ultraviolet ray and irradiate the same obliquely onto the photoelectron emission material 5. Reflection mirrors 1 are also provided at an opposite side of the ultraviolet ray lamps 2 to the supporter 4. The reflection mirror 1 is spaced apart from the ultraviolet ray lamp 2. The ultraviolet ray lamps 2 emit ultraviolet rays 3 or electromagnetic wave including the ultraviolet rays 3. The ultraviolet rays 3 emitted toward the reflection mirrors 1 are reflected by the reflection mirrors 1 toward the photoelectron emission material 5 whereby the reflected ultraviolet rays 3 are irradiated onto the photoelectron emission material 5. Since the photoelectron emission material 5 has a photoelectric threshold which is lower than an energy of the ultraviolet ray 3, the photoelectron emission material 5 emits photoelectrons 6. The photoelectron 6 is then irradiated onto an impurity 7 whereby the impurity 7 is ionized by photoelectron 7. An electrode 9 is provided which is connected to a dc power source 12 for receiving an application of a high voltage. The supporter 4 is also connected to the dc power source 12 for receiving an application of a low voltage. Namely, the electrode 9 and the supporter 4 are biased by the dc power source 12. The electrode 9 is spaced apart from the supporter 4. A catalyst 8 capable of decomposing the impurity 8 is provided on the electrode 9 so as to form an electrode 10 for decomposing impurity. The catalyst 8 on the electrode 9 faces to and is distanced from the photoelectron emission material 5 on the supporter 4. An electric field is applied to a space between the supporter 4 and the electrode 9 biased by the dc power source 12. The impurities 7 are floating in the space between the supporter 4 and the electrode 9. The impurity 7 is ionized by photoelectron and then attracted toward the electrode 9 by the electric field. Since the catalyst 8 extends over the surface of the electrode 9, the ionized impurity 7 is captured by the catalyst 8 which is capable of decomposing the impurity 8 into a decomposition product 11. The decomposition product 11 is removed from the surface of the electrode 9. Namely, the impurity 7 is ionized by the photoelectron 6 and recomposed by the catalyst 8 into the decomposition product 11. As a result, the impurity is removed continuously without excessive accumulation of the captured impurity on the electrode 10. This means it unnecessary to discontinue application of a voltage to the capturing electrode. The above apparatus is free from the problem with rediffusion or release of the ionized impurity once captured with the electrode.

In the above third embodiment, the photoelectron emission material 5 comprises Au. Notwithstanding, metals having smaller photoelectric threshold values than an energy of the ultraviolet ray are available. For, example, Ag (4.46 eV), Al (4.20 eV), Au (4.89 eV), B (4.50 eV), Be (3.90 eV), Bi (4.26 eV), C (4.81 eV), Cu (4.45 eV), Fe (4.44 eV), Mg (3.67 eV), Nb (4.37 eV), Pb (4.00 eV), Rh (4.29 eV), Pb (4.00 eV), Sn (4.29 eV), Ta (4.13 eV), Zn (4.29 eV), and Zr (4.33 eV) are available. Further, alloys of the above metals, carbonate of the above metals and borate of the above metals are also available.

As the ultraviolet ray lamp 2, a mercury-arc lamp with main emission wavelength of about 254 nm, carbon-arc lamp with main emission wavelength of about 375 nm, and xenon lamp with main emission wavelength of about 460 nm are also available.

It is preferable that the photoelectron emission material 5 and the supporter 4 are thin for allowing the ultraviolet ray 3 to penetrate the photoelectron emission material 5 and the supporter 4 for emission of photoelectron 6 at a high efficiency In the above third embodiment, the quartz supporter 4 is coated with Au. Notwithstanding, other materials through which ultraviolet ray may penetrate are available for the supporter 4.

The electrode 9 comprises an iron rod plated with palladium. The catalyst comprises platinum as oxidation catalyst.

Further, the impurity 7 comprises dioctylphthalate. The power source 12 applies a voltage of 120 V to the electrode 9 for having the catalyst 8 capture the ionized impurity 7 and decompose the captured impurity into carbon dioxide and water as the decomposition product 11. The catalyst 8 causes an oxidation and decomposition reaction of dioctylphthalate. After 1000 hours has past, no accumulation of dioctylphthalate on the electrode 10 is observed.

An analyze of gases in the chamber was made to confirm the fact that an impurity of dioctylphthalate in the gas is gradually decreased whilst an impurity of carbon dioxide in the gas is gradually increased. This means that dioctylphthalate is captured by the electrode 10 and decomposed into carbon dioxide and water.

Fourth Embodiment

A fourth embodiment according to the present invention will be described in detail with reference to FIG. 2 illustrative of an apparatus for removing impurity from a space in the vicinity of a surface of a substrate.

The apparatus comprises the following elements. A supporter 4 is provided for supporting a photoelectron emission material 5 thereon. The supporter 4 is made of a material which prevents electromagnetic waves including ultraviolet ray from penetrating itself. Ultraviolet ray lamps 2 are provided obliquely in front of the photoelectron emission material 5 but to obliquely face to the photoelectron emission material 5 but to be spaced from the photoelectron emission material 5 so that the ultraviolet ray lamps 2 emit electromagnetic waves including ultraviolet ray and irradiate the same obliquely onto the photoelectron emission material 5. Reflection mirrors 1 are also provided at an opposite side of the ultraviolet ray lamps 2 to the supporter 4. The reflection mirror 1 is spaced apart from the ultraviolet ray lamp 2. The ultraviolet ray lamps 2 emit ultraviolet rays 3 or electromagnetic wave including the ultraviolet rays 3. The ultraviolet rays 3 emitted toward the reflection mirrors 1 are reflected by the reflection mirrors 1 toward the photoelectron emission material 5 whereby the reflected ultraviolet rays 3 are irradiated onto the photoelectron emission material 5. Since the photoelectron emission material 5 has a photoelectric threshold which is lower than an energy of the ultraviolet ray 3, the photoelectron emission material 5 emits photoelectrons 6. The photoelectron 6 is then irradiated onto an impurity 7 whereby the impurity 7 is ionized by photoelectron 7. An electrode 9 is provided which is connected to a dc power source 12 for receiving an application of a high voltage. The supporter 4 is also connected to the dc power source 12 for receiving an application of a low voltage. Namely, the electrode 9 and the supporter 4 are biased by the dc power source 12. The electrode 9 is spaced apart from the supporter 4. A catalyst 8 capable of decomposing the impurity 8 is provided on the electrode 9 so as to form an electrode 10 for decomposing impurity. The catalyst 8 on the electrode 9 faces to and is distanced from the photoelectron emission material 5 on the supporter 4. An electric field is applied to a space between the supporter 4 and the electrode 9 biased by the dc power source 12. The impurities 7 are floating in the space between the supporter 4 and the electrode 9. The impurity 7 is ionized by photoelectron and then attracted toward the electrode 9 by the electric field. Since the catalyst 8 extends over the surface of the electrode 9, the ionized impurity 7 is captured by the catalyst 8 which is capable of decomposing the impurity 8 into a decomposition product 11. The decomposition product 11 is removed from the surface of the electrode 9. Namely, the impurity 7 is ionized by the photoelectron 6 and recomposed by the catalyst 8 into the decomposition product 11. As a result, the impurity is removed continuously without excessive accumulation of the captured impurity on the electrode 10. This means it unnecessary to discontinue application of a voltage to the capturing electrode. The above apparatus is free from the problem with rediffusion or release of the ionized impurity once captured with the electrode.

In the above fourth embodiment, the photoelectron emission material 5 comprises Au. Notwithstanding, metals having smaller photoelectric threshold values than an energy of the ultraviolet ray are available. For, example, Ag (4.46 eV), Al (4.20 eV), Au (4.89 eV), B (4.50 eV), Be (3.90 eV), Bi (4.26 eV), C (4.81 eV), Cu (4.45 eV), Fe (4.44 eV), Mg (3.67 eV), Nb (4.37 eV), Pb (4.00 eV), Rh (4.29 eV), Pb (4.00 eV), Sn (4.29 eV), Ta (4.13 eV), Zn (4.29 eV), and Zr (4.33 eV) are available. Further, alloys of the above metals, carbonate of the above metals and borate of the above metals are also available.

As the ultraviolet ray lamp 2, a mercury-arc lamp with main emission wavelength of about 254 nm, carbon-arc lamp with main emission wavelength of about 375 nm, and xenon lamp with main emission wavelength of about 460 nm are also available.

It is preferable that the photoelectron emission material 5 and the supporter 4 are thin for allowing the ultraviolet ray 3 to penetrate the photoelectron emission material 5 and the supporter 4 for emission of photoelectron 6 at a high efficiency.

In the above fourth embodiment, the quartz supporter 4 is coated with Au. Notwithstanding, other materials through which ultraviolet ray may penetrate are available for the supporter 4.

The electrode 9 comprises an iron rod plated with palladium. The catalyst comprises platinum as oxidation catalyst.

Further, the impurity 7 comprises linoleic acid. The power source 12 applies a voltage of 120 V to the electrode 9 for having the catalyst 8 capture the ionized impurity 7 and decompose the captured impurity into carbon dioxide and water as the decomposition product 11. The catalyst 8 causes an oxidation and decomposition reaction of a linoleic acid. After 1000 hours has past, no accumulation of linoleic acid on the electrode 10 is observed.

An analyze of gases in the chamber was made to confirm the fact that an impurity of linoleic acid in the gas is gradually decreased whilst an impurity of carbon dioxide in the gas is gradually increased. This means that linoleic acid is captured by the electrode 10 and decomposed into carbon dioxide and water.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims any modifications of the present invention which fall within the spirit and scope of the present invention.

What is claimed is:

1. An apparatus for removing impurity, comprising:
    means for supporting thereon a photoelectron emission material which emits photoelectron upon receipt of an electromagnetic wave having a higher energy than a photoelectric threshold value of said photoelectron emission material;
    an electrode distanced from said means for supporting said photoelectron emission material via a space which possesses gases including an impurity, said electrode being electrically connected via a power source to said means for supporting said photoelectron emission material so that said electrode is applied with a voltage to apply an electric field to said space; and
    means for irradiating said electromagnetic wave onto said photoelectron emission material to cause said photoelectron emission material to emit, into said space, photoelectron which is capable of ionizing said impurity in said gases so that an ionized impurity is attracted toward said electrode,
    wherein said electrode has a surface coated with a catalyst which is capable of decomposing said ionized impurity into decomposition products so that said catalyst captures and decomposes said ionized impurity into decomposition products without accumulation of said ionized impurity on said surface of said electrode.

2. The apparatus as claimed in claim 1, wherein said electrode comprises an iron rod coated with a palladium layer and said catalyst comprises platinum coated on said palladium layer.

3. The apparatus as claimed in claim 1, wherein said catalyst comprises an oxidation catalyst which decomposes dioctylphthalate as said impurity into carbon dioxide and water.

4. The apparatus as claimed in claim 1, wherein said catalyst comprises an oxidation catalyst which decomposes a linoleic acid as said impurity into carbon dioxide and water.

5. The apparatus as claimed in claim 1, wherein said means for irradiating said electromagnetic wave comprises at least a ultraviolet ray lamp which is positioned at an opposite side of said means for supporting said photoelectron emission material to said photoelectron emission material, and wherein said means for supporting said photoelectron emission material comprises a supporting plate made of a material which allows said ultraviolet ray to penetrate through said supporting plate so that said ultraviolet ray lamp emits a ultraviolet ray which penetrates through said supporting plate and reaches said photoelectron emission material such that said photoelectron emission material emits photoelectron.

6. The apparatus as claimed in claim 5, further comprising at least a reflection mirror provided at an opposite side of said ultraviolet ray lamp to said supporting plate for reflecting a ultraviolet ray emitted from said ultraviolet ray lamp toward said supporting plate so that a reflected ultraviolet ray penetrates through said supporting plate and reaches said photoelectron emission material.

7. The apparatus as claimed in claim 1, wherein said means for irradiating said electromagnetic wave comprises at least a ultraviolet ray lamp which is positioned at a front side of said photoelectron emission material for emitting a ultraviolet ray and irradiating said ultraviolet ray directly onto said photoelectron emission material such that said photoelectron emission material emits photoelectron.

8. The apparatus as claimed in claim 7, wherein a plurality of said ultraviolet ray lamps are provided obliquely in front of said photoelectron emission material for irradiating said ultraviolet ray obliquely onto said photoelectron emission material.

9. The apparatus as claimed in claim 7, wherein said means for supporting said photoelectron emission material comprises a supporting plate made of a material which prevents said ultraviolet ray from penetrating through said supporting plate.

10. The apparatus as claimed in claim 7, further comprising at least a reflection mirror provided at an opposite side of said ultraviolet ray lamp to said supporting plate for reflecting a ultraviolet ray emitted from said ultraviolet ray lamp toward said supporting plate so that a reflected ultraviolet ray is irradiated onto said photoelectron emission material.

11. An apparatus for removing impurity, comprising:
    a supporter for supporting thereon a photoelectron emission material which emits photoelectron upon receipt of an electromagnetic wave having a higher energy than a photoelectric threshold value of said photoelectron emission material,
    an electrode distanced from said supporter via a space which possesses gases including an impurity, said electrode being electrically connected via a power source to said supporter so that said electrode is applied with a voltage to apply an electric field to said space; and
    an electromagnetic wave emitter for irradiating said electromagnetic wave onto said photoelectron emission material to cause said photoelectron emission material to emit, into said space, photoelectron which is capable of ionizing said impurity in said gases so that an ionized impurity is attracted toward said electrode,
    wherein said electrode has a surface coated with a catalyst which is capable of decomposing said ionized impurity into decomposition products so that said catalyst captures and decomposes said ionized impurity into decomposition products without accumulation of said ionized impurity on said surface of said electrode.

12. The apparatus as claimed in claim 11, wherein said electrode comprises an iron rod coated with a palladium layer and said catalyst comprises platinum coated on said palladium layer.

13. The apparatus as claimed in claim 11, wherein said catalyst comprises an oxidation catalyst which decomposes dioctylphthalate as said impurity into carbon dioxide and water.

14. The apparatus as claimed in claim 11, wherein said catalyst comprises an oxidation catalyst which decomposes a linoleic acid as said impurity into carbon dioxide and water.

15. The apparatus as claimed in claim 11, wherein said electromagnetic wave emitter comprises at least a ultraviolet ray lamp which is positioned at an opposite side of said supporter to said photoelectron emission material, and wherein said supporter comprises a supporting plate made of a material which allows said ultraviolet ray to penetrate through said supporting plate so that said ultraviolet ray lamp emits a ultraviolet ray which penetrates through said supporting plats and reaches said photoelectron emission material such that said photoelectron emission material emits photoelectron.

16. The apparatus as claimed in claim 15, further comprising at least a reflection mirror provided at an opposite side of said ultraviolet ray lamp to said supporting plate for reflecting a ultraviolet ray emitted from said ultraviolet ray lamp toward said supporting plate so that a reflected ultraviolet ray penetrates through said supporting plate and reaches said photoelectron emission material.

17. The apparatus as claimed in claim 11, wherein said electromagnetic wave emitter comprises at least a ultraviolet ray lamp which is positioned at a front side of said photoelectron emission material for emitting a ultraviolet ray and irradiating said ultraviolet ray directly onto said photoelectron emission material such that said photoelectron emission material emits photoelectron.

18. The apparatus as claimed in claim 17, wherein a plurality of said ultraviolet ray lamps are provided obliquely in front of said photoelectron emission material for irradiating said ultraviolet ray obliquely onto said photoelectron emission material.

19. The apparatus as claimed in claim 17, wherein said supporter comprises a supporting plate made of a material which prevents said ultraviolet ray from penetrating through said supporting plate.

20. The apparatus as claimed in claim 17, further comprising at least a reflection mirror provided at an opposite side of said ultraviolet ray lamp to said supporting plate for reflecting a ultraviolet ray emitted from said ultraviolet ray lamp toward said supporting plate so that a reflected ultraviolet ray is irradiated onto said photoelectron emission material.

\* \* \* \* \*